United States Patent [19]
Rodeghero

[11] Patent Number: 5,401,908
[45] Date of Patent: Mar. 28, 1995

[54] INSULATED CONDUCTOR PAIRS AND METHOD AND APPARATUS OF MAKING SAME

[75] Inventor: Thomas L. Rodeghero, Richmond, Ind.

[73] Assignee: Cooper Industries, Inc., Houston, Tex.

[21] Appl. No.: 50,619

[22] Filed: Apr. 22, 1993

[51] Int. Cl.⁶ .............................................. H01B 7/36
[52] U.S. Cl. ...................... 174/112; 174/34; 174/117 F
[58] Field of Search ................ 174/112, 117 F, 34

[56] References Cited

U.S. PATENT DOCUMENTS

| | | |
|---|---|---|
| 1,823,885 | 9/1931 | Cherry . |
| 1,832,885 | 9/1931 | Cherry . |
| 1,862,005 | 6/1932 | Cherry et al. . |
| 2,089,774 | 8/1937 | Wachstein . |
| 2,204,782 | 6/1940 | Wermine . |
| 2,521,123 | 9/1950 | Lawrence . |
| 2,768,911 | 10/1956 | Bunch . |
| 2,945,265 | 7/1960 | Sell, Jr., et al. . |
| 3,020,335 | 2/1962 | Gillis . |
| 3,031,524 | 4/1962 | Hicks . |
| 3,102,160 | 8/1963 | Cook et al. ............ 174/105 R |
| 3,288,895 | 11/1966 | Windeler . |
| 3,303,252 | 2/1967 | Rogers . |
| 3,720,747 | 3/1973 | Anderson et al. . |
| 4,160,426 | 7/1979 | Lambelet .............. 118/323 |
| 4,248,824 | 2/1981 | Hattop ................... 264/171 |
| 4,368,214 | 1/1983 | Gillette ................ 174/117 F |
| 4,629,285 | 12/1986 | Carter et al. .......... 174/112 |
| 4,761,129 | 8/1988 | Aste et al. ............. 425/133.1 |
| 4,998,870 | 3/1991 | Seibert .................. 425/113 |

FOREIGN PATENT DOCUMENTS

| | | | |
|---|---|---|---|
| 260837 | 11/1926 | United Kingdom ........ 174/112 |
| 1067340 | 5/1967 | United Kingdom ........ 174/112 |

Primary Examiner—Morris H. Nimmo
Attorney, Agent, or Firm—Laff, Whitesel, Conte & Saret, Ltd.

[57] ABSTRACT

An insulated conductor pair includes a first insulated conductor including a first insulating material over more than half of an exterior surface of the first insulated conductor. The insulated conductor pair further includes a second insulated conductor including a second insulating material over more than half of an exterior surface of the second insulated conductor. The first and second insulating materials are distinguishable from one another.

8 Claims, 6 Drawing Sheets

INSULATED CONDUCTOR PAIRS AND METHOD AND APPARATUS OF MAKING SAME

FIELD OF THE INVENTION

The present invention relates to conductors and, more particularly, to insulated conductor pairs.

BACKGROUND AND SUMMARY OF THE INVENTION

The use of conductors arranged in pairs is well known from the use of such conductor pairs in telephone circuitry and other high-frequency applications. Such conductor pairs, and conductors generally, are used in situations where, for example, it is necessary to extend large quantities of conductors between two points. To avoid checking each conductor of a large number of conductors for conductivity at each end of a plurality of conductors, various means for identifying the individual conductors of the plurality of conductors have been devised. Among the more popular means of identifying individual conductors is through the use of a color code system, whereby individual conductors are coated with differently colored insulating material for purposes of identification. Other techniques for identifying individual conductors include the printing of markings such as stripes or words on the insulating material.

The great need for conductor pairs in applications such as those noted above has been a motivating factor in the development of a highly competitive industry in manufacturing such conductor pairs, and has led to a variety of techniques for manufacturing such conductor pairs. According to one technique, individual conductors are coated with an insulating material and subsequently bonded together by, for example, an adhesive (herein referred to as a "bonded pair"). According to another technique, individual, substantially parallel conductors are guided through an extruder apparatus in which they are both covered with insulating material in a single coating operation so that they are extruded together in an attached form or are forced together so that they attach to one another shortly after being extruded (herein referred to as an "attached pair"). The individual conductors of an bonded or attached pair are preferably separable by breaking a web or attachment point between them so that their ends can be connected to desired connectors.

It is particularly useful to be able to identify conductors as part of a conductor pair. Earlier methods of identifying conductors as part of a conductor pair included simply twisting a pair of wires together. More advantageous methods of identifying conductors as part of a conductor pair include the above-mentioned techniques for forming bonded pairs or attached pairs to avoid the likelihood of separation of conductor pairs that are not physically joined. Further, it has been found to be desirable to provide color code markings on individual ones of the conductor pairs to facilitate identification of the conductor pairs.

Industry standards such as those of the National Electrical Code TM and the Insulated Cable Engineers Association, Inc., (ICEA) have standardized color code schemes and established guidelines for identifying conductor pairs. For example, ICEA has promulgated Standards for Communications Wire and Cable for Wiring of Premises setting out standards for insulating material color combinations for so-called "tip" and "ring" conductors of a pair. In Section 4.4 it is stated that, "positive identification of the associated 'tip' and 'ring' conductors of a pair shall be accomplished by marking or striping each insulated conductor of a pair with the color of its mate". The ICEA's Standards further note that, in cables with five or less pairs, the marking of the ring conductor may be omitted. It is desirable to comply with this standard by forming a first insulated conductor that is primarily a first color and a second insulated conductor that is primarily a second color, and providing identification on one or both of the conductors, in the form of a marking or stripe of the color of the mate, so that the there is less of the colored identification on the particular conductor than there is of the primary color of the particular conductor.

Figure 1A:
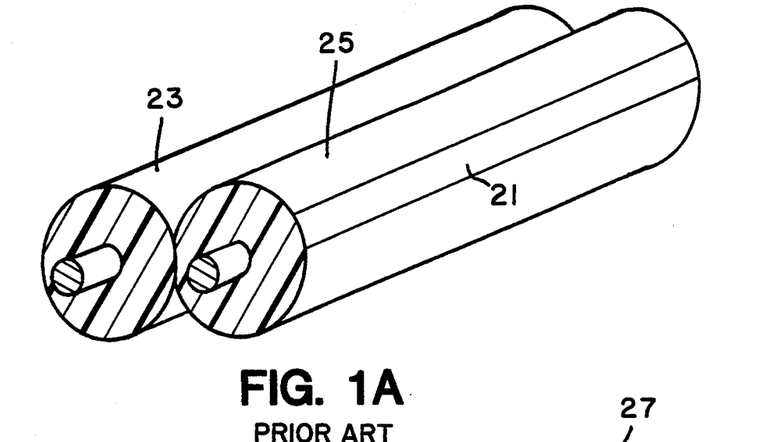
FIGS. 1A–1C are perspective, partially cross-sectional views of conductor pairs including two insulated conductors formed primarily of the same color insulation and including a longitudinal ink stripe applied to one of the conductors, a series of circumferential bands of ink applied to one of the conductors, and a coextruded stripe applied to one of the conductors, respectively.
Figure 1B:
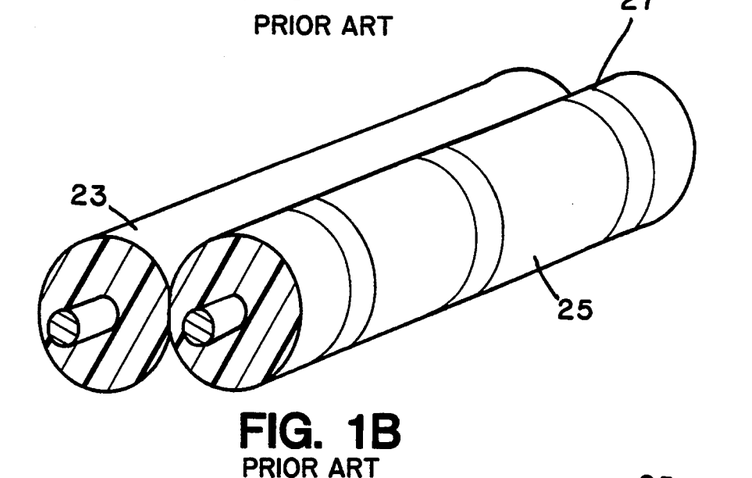

Various difficulties are presented in marking or striping of tip and ring conductors in conductor pairs so that they meet industry standards. For example, conductor pairs formed as attached pairs are typically insulated with a single insulating material so that it is necessary to mark at least one conductor of the pair so that it has a mark or stripe of the color of its mate. While it is possible to provide ink markings on each conductor of the pair, beside being subject to smearing of the ink, as seem in FIG. 1A, ink markings in the form of stripes 21 are typically only applied over less than half of the conductors 23, 25 so that each conductor is more properly described as being the same color with a stripe of a different color. Ink markings in the form of bands 27 are shown in FIG. 1B are also typically applied over less than half of the conductors 23, 25 so that each conductor is properly described as being the same color with a stripe of a different color. Further, band marking of conductors is preferably performed on a single insulated conductor prior to forming a bonded pair or an attached pair, rather than in applications involving attached pairs that are extruded as attached pairs.

Figure 1C:
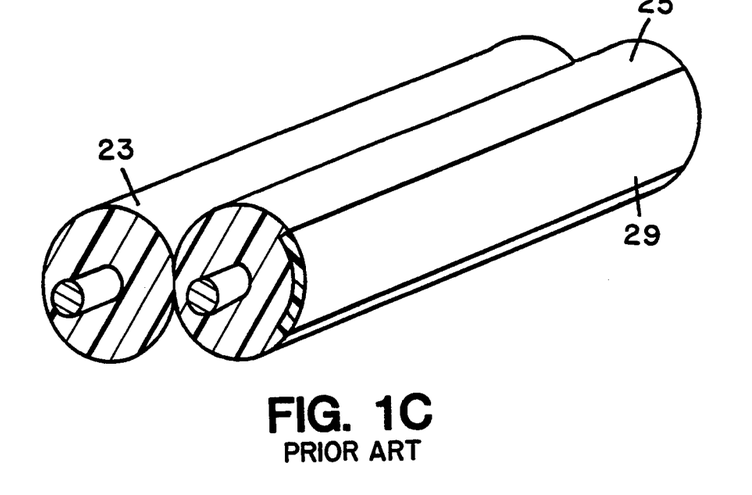

Another technique for applying color coding stripes is the coextrusion technique described in U.S. Pat. Nos. 2,521,123, 3,288,895, and 4,248,824. In U.S. Pat. No. 3,288,895, in which a pair of conductors is produced, a main extruder feeds the main insulating material into a main extruder die and stripes of colored material are fed into the main extruder die from auxiliary extruders to form stripes on a pair formed of another color. However, the thickness of the colored material materially alters the unit capacitance of the conductor and maintaining capacitance balance in the pair requires optimization of the depth of the stripes. Further, as shown herein at FIG. 1C, the pair of insulated conductors 23, 25 does not produce two conductors that are primarily different colors but, rather, includes two conductors that are both primarily one color, with a stripe 29 along the length of at least one of the conductors.

U.S. Pat. No. 3,720,747 to Anderson et al. describes yet another technique for color coding multiple conductors in which insulating material of desired colors is arranged in a preform, and the preform is placed in an extruder. While the technique described therein is adapted to produce pairs of conductors having primarily different colors, the technique is complicated in that it includes a number of steps, such as arranging the insulating material in the preform prior to coating of the conductor with the insulating material.

In addition to the desirability of color coding conductor pairs, it is desirable to minimize crosstalk in conductor cables. In U.S. patent application Ser. No.

08/032,149 entitled "Twisted Parallel Cable" by Kenny and Siekierka, filed Mar. 17, 1993 it is noted that it is known that twisting conductor pairs can be performed to minimize electrical coupling between paired conductors. In that application, the inventors recognize the benefits of controlling center-to-center distances in a twisted conductor pair for purposes of stabilizing capacitance within a cable. Further, the inventors recognize the benefits of controlling center-to-center conductor spacing on all cables used in a particular design so that impedances in the design are matched, thereby minimizing problems with signal loss and tracking error (jitter). The inventors propose controlling the center-to-center distance in twisted pair cables so that the variation in the distance between the centers of adjacent conductors, the center-to-center distances, along a twisted pair cable is very small. The center-to-center distance at any point along the twisted parallel cable does not vary by more than ±0.03 times the statistical average of at least 20 measurements of center-to-center distances taken along each 1000 feet of cable with each measurement taken at least 20 feet apart. Alternatively, or in combination, the inventors propose providing conductors and corresponding dielectric layers twisted along the length of a cable having, over any 1000 ft. length of the cable, an average impedance of approximately 90 to 110 ohms when measured at high frequencies of approximately 10 MHz to approximately 200 MHz with a tolerance of ±5% from an average measured from a randomly selected 1000 feet of twisted cable. It is desirable to provide a conductor pair combining the advantages of controlled center-to-center distances between conductors and/or controlled impedance characteristics proposed by Kenny and Siekierka with the simplicity of use available in color coded conductor pairs.

OBJECTS AND SUMMARY

It is an object of the present invention to provide a conductor pair that complies with applicable industry standard for color coding conductor pairs.

It is further an object of the present invention to provide a conductor pair that complies with applicable industry standards for color coding conductor pairs and in which center-to-center distances between conductors in a conductor pair are maintained within a predetermined range.

It is further an object of the present invention to provide a conductor pair that complies with applicable industry standards for color coding conductor pairs and in which impedance characteristics of the conductor pair is maintained within a predetermined range.

In accordance with one aspect of the present invention, a conductor pair is provided including a first insulated conductor that is primarily coated with a first insulating material and a second insulated conductor that is primarily coated with a second insulating material. Identification is provided on one or both of the conductors, in the form of a marking or stripe of the color of the mate, so that the there is less of the colored identification on the particular insulated conductor than there is of the primary color of the particular insulated conductor.

In accordance with another aspect of the invention, a method for making an insulated conductor pair is described. In accordance with the method, a first insulating material is applied around a first conductor such that the first insulating material forms more than half of an exterior surface of a first insulated conductor. A second insulating material is applied around a second conductor such that the second insulating material forms more than half of an exterior surface of a second insulated conductor. A center-to-center distance between the first and second conductors is maintained within a predetermined range.

In accordance with yet another aspect of the present invention, in an apparatus for making an insulated conductor pair a first insulating material and a second insulating material are combined in an extruder apparatus. A first and a second parallel conductor are guided by a guiding assembly through the extruder apparatus so that the first and second insulating materials surround at least portions of the first and second conductors, respectively. Exterior surfaces are formed on the first and second conductors as they are drawn through a forming die such that the first and second conductors having exterior surfaces form a pair of insulated conductors. The first insulating material is formed around at least half of the first conductor and the second insulating material is formed around at least half of the second conductor.

DESCRIPTION OF THE DRAWINGS

The present invention can be further understood with reference to the following description in conjunction with the appended drawings, wherein like elements are provided with the same reference numerals.

DETAILED DESCRIPTION

Figure 2:
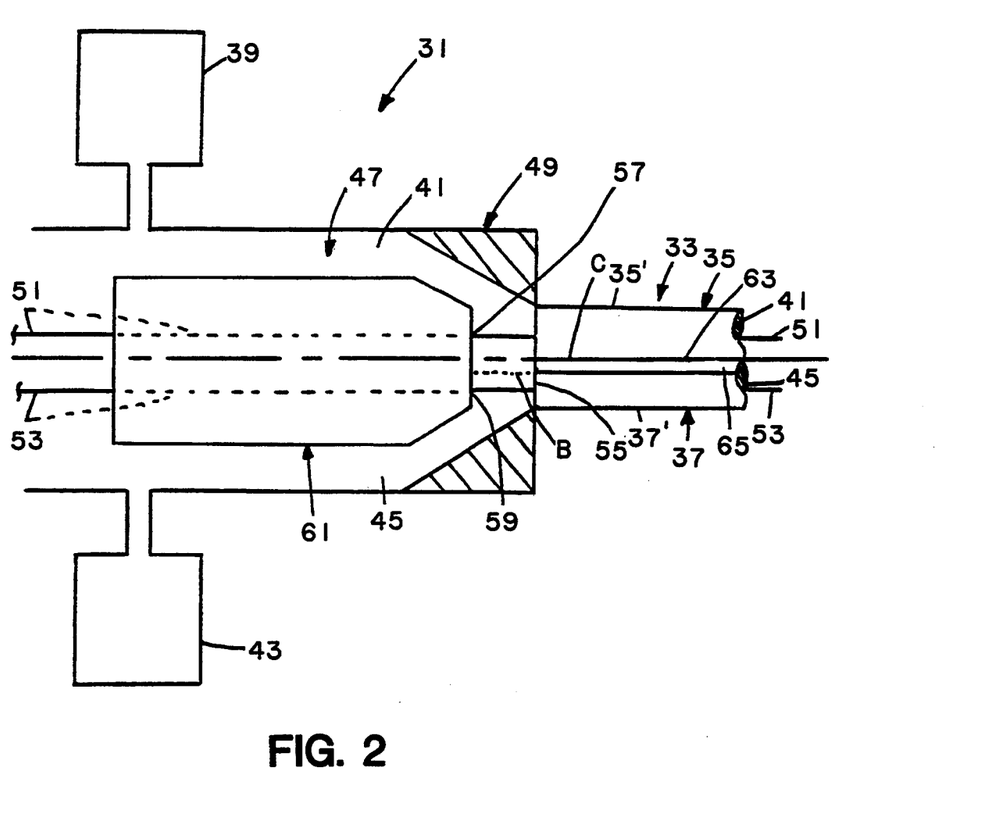
FIG. 2 is a schematic, partially cross-sectional view of an apparatus for forming a conductor pair according to an embodiment of the present invention.

With reference to FIG. 2, an apparatus 31 for forming an insulated conductor pair 33 including an insulated conductor 35 and a insulated conductor 37 is shown. The apparatus 31 includes a primary extruder 39 for extruding a first insulating material 41 and a secondary extruder 43 for extruding a second insulating material 45. The first and second insulating materials 41, 45 may each be the same one of any suitable material normally used in the insulation of cables, such as polyvinylchloride, polyethylene, polypropylene, or fluoro-copolymers (such as Teflon, which is a registered trademark of DuPont), crosslinked polyethylene, rubber, etc. In accordance with the preferred embodiment, the first and second insulating materials are different colors and are selected from the standard color combinations set forth in the ICEA Standards at, e.g., Table 4–3.

The primary extruder 39 and the secondary extruder 43 deliver the first and second insulating materials 41, 45, respectively, to a chamber 47 in a die 49. The first and second insulating materials 41, 45 are combined in a controlled fashion so that they form a single insulating material. However, the combination of the first and second insulating materials 41, 45 is controlled so that there is substantially no turbulence or intermingling of the first and second insulating materials, and a well-defined boundary B between the first and second insulating materials is maintained.

A first conductor 51 and a second conductor 53 are guided through the chamber 47 of the die 49, through the combined first and second insulating materials 41, 45, and through an opening 55 in the die in a known fashion. Preferably, the first and second conductors 51, 53 are guided by means such as side by side openings 57, 59, respectively, in a guide tip 61. The first and second conductors 51, 53 are preferably guided so that the center-to-center distance from the first conductor to the second conductor at any point along the twisted parallel cable does not vary by more than ±0.03 times the statistical average center-to-center distance with the statistical average being calculated by taking at least twenty measurements of each 1000 ft. of cable with each measurement taken at least twenty feet apart. The first and second conductors 51, 53 may be constructed of any suitable material, in solid or stranded form, including copper, metal coated substrate, silver, aluminum, steel, alloys, or a combination thereof.

As the first and second conductors 51, 53 are guided through the chamber 47 in the die 49, they are coated with the first and second insulating materials 41, 45. As the first and second conductors 51, 53 are drawn through the opening 55 in the die 49 and first and second insulating materials 41, 45 on the first and second conductors is extruded through the opening with the first and second conductors, the first and second insulated conductors 35, 37 having exterior surfaces 35', 37' are formed, the first and second insulated conductors 35, 37 forming the insulated conductor pair 33. As is known, depending upon whether the insulated conductors 35, 37 are extruded as an attached pair or are joined to one another subsequent to exiting the die 49, such as by being forced together or bonded together by an adhesive, the opening 55 is a single opening of a desired, preferably figure "8" shape, or, preferably, two separate openings of desired shapes, preferably circular, respectively. The exterior surfaces 35', 37' of the first and second insulated conductors 35, 37 are preferably substantially circular, as a result of the peripheral shape of the opening 55 being substantially circular or in the form of a figure "8", and meet at a web or attachment point 63 formed by one or both of the first and second insulating materials 41, 45. The web or attachment point 63 is preferably thin and weaker than the adjacent first and second insulated conductors and thereby facilitates separation of the first and second insulated conductors by being easily broken. The force necessary to separate the first and second insulated conductors 35, 37 by breaking the web or attachment point between them is usually between 0.1 and 5 lbs force and preferably between 0.25 and 2.5 lbs force.

By controlling the rate at which the primary and secondary extruders 39, 43 deliver first and second insulating materials to the chamber 47 of the die 49 and controlling the combination of the first and second insulating materials in the chamber, it is possible to form various embodiments of the insulated conductor pair of the present invention. For example, when the primary extruder 39 extrudes first insulating material 41 at a faster rate than the secondary extruder 43 extrudes second insulating material 45, the first insulating material flows over a centerline C of the chamber and the first and second conductors 51, 53. The insulated conductor pair 33 that is formed has a first insulated conductor 35 formed of the first conductor 51 having an exterior surface 35' formed entirely of first insulating material 41, a second insulated conductor 37 having an exterior surface 37' formed of both first insulating material and second insulating material 45, and a web or attachment point 63 formed of the first insulating material. Following extrusion of the insulated conductor pair 33 through the opening 55, the insulated conductor pair is ordinarily quenched, such as by immersion in a liquid such as water. Other known operations subsequent to extrusion of the conductors include providing printed band markings on individual conductors, usually prior to immersion in a quenching liquid, providing printed stripes on conductors, and providing conductor pairs with a desired twist. The insulated conductor pair 33 preferably possesses the characteristics, including low crosstalk and average impedance of approximately 90 to 110 ohms when measured at high frequencies of approximately 10 MHz to approximately 200 MHz with a tolerance of ±5% from an average measured from a randomly selected 1000 feet of twisted cable, of the twisted parallel cable described in U.S. patent application Ser. No. 08/032,149 entitled "Twisted Parallel Cable" by Kenny and Siekierka, filed Mar. 17, 1993 discussed above and hereby incorporated by reference.

By setting up the primary and secondary extruders 39, 43 to deliver first insulating material 41 and second insulating material 45 in appropriate quantities, it is possible, through use of the apparatus 31, to form an insulated conductor pair 33 having a first insulated conductor 35 having an exterior surface 35' formed entirely of first insulating material 41 and a second insulated conductor 37 having an exterior surface 37' formed primarily of second insulating material 45 and secondarily of first insulating material. By coloring the first and second insulating materials 41, 45 appropriately in accordance with industry standards, the insulated conductor pair 33 complies with those standards in that a longitudinal stripe 65 having the color of the exterior surface 35' of the first insulated conductor 35 is formed on the exterior surface 37' of the second insulated conductor 37. The stripe 65 thus formed is resistant to smearing, unlike printed stripes or bands, and does not result in disadvantageous electrical characteristics of the insulated conductor pair 33 in that the stripe is formed of the same material as the remainder of the insulation on the second conductor 53.

Further, insulated conductor pairs having desired characteristics may be formed according to any desired method whereby the first insulating material 41 is applied around the first conductor 51 such that the first insulating material preferably forms more than half of the exterior surface 35' of the first insulated conductor 35. The second insulating material 45 is applied around the second conductor 53 such that the second insulating material preferably forms more than half of the exterior surface 37' of the second insulated conductor 37. The first and second insulated conductors 35, 37 are extruded through the opening 55 of a die 49 as the insulated pair 33.

At least one of the first and second insulated conductors 35, 37 are preferably identified as corresponding to the conductor pair 33 including the first and second insulated conductors. While the identification of the first and second insulated conductors 35, 37 may be in a form such as a printed marking, described further below, the identification of the first and second insulated conductors is preferably performed as a result of the "flow over" of at least one of the first and second insulating materials 41, 45 to form a portion of the exterior 35', 37' of the first and second insulated conductors 35, 37.

Figure 6:
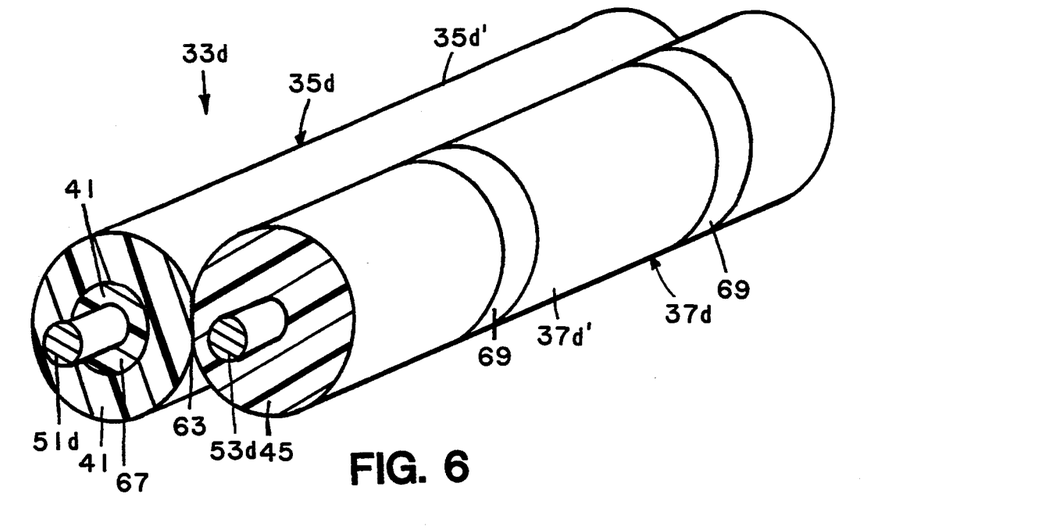
FIG. 6 is a perspective, partially cross-sectional view of a conductor pair according to a fourth embodiment of the present invention.

If desired, such as for purposes of identification of one or both of the first and second insulated conductors 35, 37 or for purposes of forming a desired thickness insulation layer on the conductors 51, 53, the first and second insulating materials 41, 45 is applied over an already-formed insulating layer 67, as seen in FIG. 6, and discussed further below. The insulating layer 67 is formed of one of the first or second insulating materials 41, 45, or of any desired insulating material. The insulating layer 67 is applied, as desired, either in an entirely separate coating operation or with a coextrusion arrangement of the type that is well known.

Figure 3:
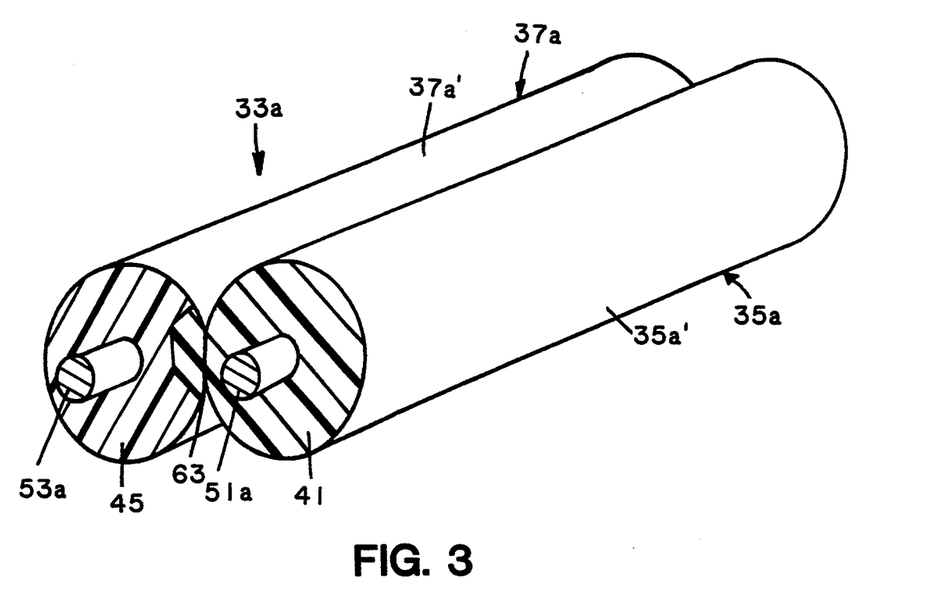
FIG. 3 is a perspective, partially cross-sectional view of a conductor pair according to a first embodiment of the present invention.

FIG. 3 shows a first embodiment of an insulated conductor pair 33a. The insulated conductor pair 33a includes a first insulated conductor 35a and a second insulated conductor 37a. The exterior surface 37a' of the second insulated conductor 37a is at least partially formed by first insulation material 41. The first insulation material 41 preferably forms a longitudinal stripe along the length of the second insulated conductor 37a for purposes of identification of that insulated conductor as one of the pair 33a.

Figure 4:
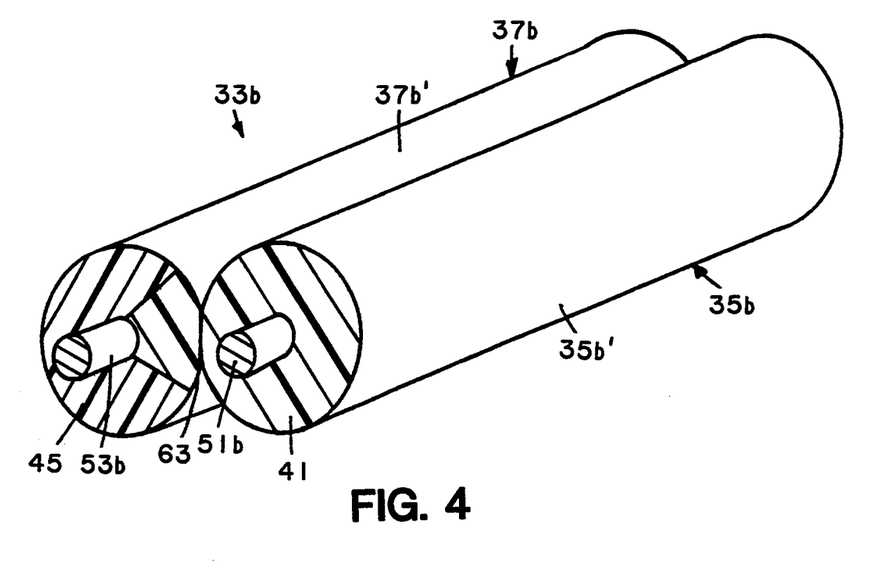
FIG. 4 is a perspective, partially cross-sectional view of a conductor pair according to a second embodiment of the present invention.

FIG. 4 shows a second embodiment of an insulated conductor pair 33b. The insulated conductor pair 33b includes a first insulated conductor 35b and a second insulated conductor 37b. The exterior surface 37b' of the second insulated conductor 37b is at least partially formed by first insulating material 41. The first insulating material 41 contacts the second conductor 53b. The first insulation material 41 preferably forms a longitudinal stripe along the length of the second insulated conductor 37b for purposes of identification of that insulated conductor as one of the pair 33b.

Figure 5:
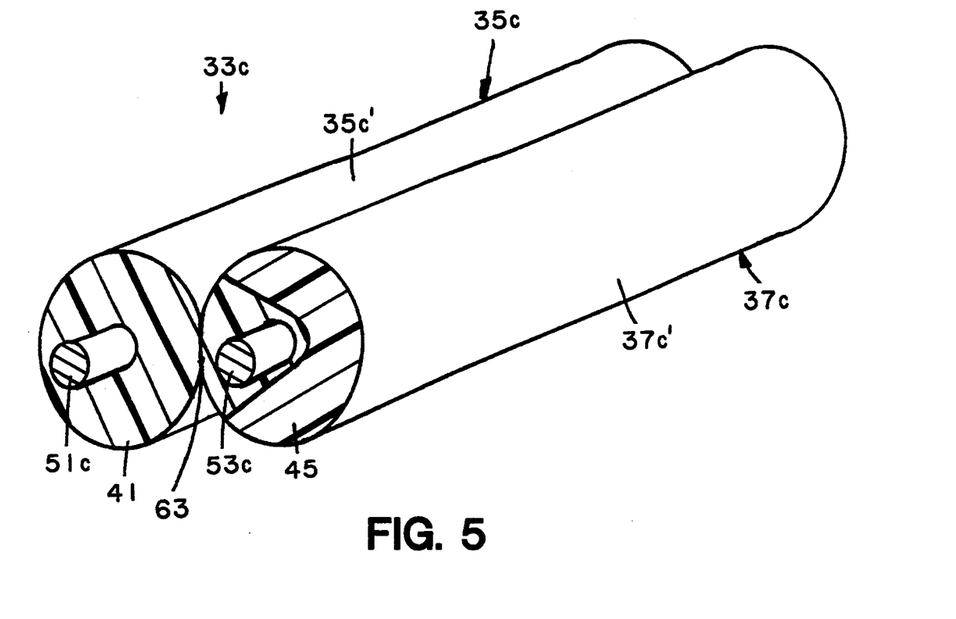
FIG. 5 is a perspective, partially cross-sectional view of a conductor pair according to a third embodiment of the present invention.

FIG. 5 shows a third embodiment of an insulated conductor pair 33c. The insulated conductor pair 33c includes a first insulated conductor 35c and a second insulated conductor 37c. The exterior surface 37c' of the second insulated conductor 37c is at least partially formed by first insulating material 41. The first insulating material 41 surrounds the second conductor 53c. The first insulation material 41 preferably forms a longitudinal stripe along the length of the second insulated conductor 37c for purposes of identification of that insulated conductor as one of the pair 33c.

The insulated conductor pairs 33a, 33b, 33c shown in FIGS. 3, 4, and 5, respectively, are all preferably formed by the previously described flow over method and apparatus whereby the amount of first insulating material 41 delivered to the chamber 47 of the die is larger than the amount of second insulating material 45 delivered to the chamber so that the controlled combination of the two insulating materials results in desired amounts of first insulating material forming the insulation around the second conductor 53. Similarly, the web or attachment point 63 is formed by the first insulating material 41.

FIG. 6 shows a fourth embodiment of an insulated conductor pair 33d, such as was briefly discussed above. The insulated conductor pair 33d includes a first insulated conductor 35d and a second insulated conductor 37d. The first conductor 51d is at least partially in contact with second insulating material 45, or some other insulating material. The second insulating material 45 preferably surrounds the first conductor 51d and is applied by means of a known coextrusion process. The second insulating material 45 preferably aids in identifying the first insulated conductor 35d as one of the pair 33d. The second insulating material 45 may also aid in increasing the overall thickness of the first insulated conductor. The exterior surface 37d' of the second insulated conductor 37d is preferably provided with identifying markings such as a narrow stripe or repeating band 69. The band 69 is preferably of the same color as the first insulating material 41. Further, the band 69 is preferably printed on, e.g., the exterior surface 37d' of the second insulated conductor 37d in ink, prior to joining of the insulated conductors 35d and 37d by bonding or otherwise attaching them.

Figure 7:
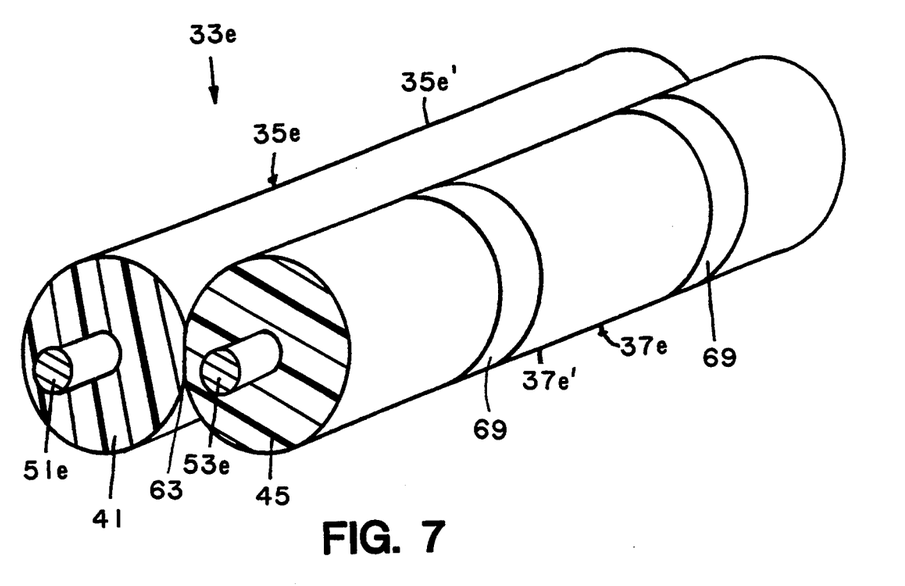
FIG. 7 is a perspective, partially cross-sectional view of a conductor pair according to a fifth embodiment of the present invention.

FIG. 7 shows a fifth embodiment of an insulated conductor pair 33e. The insulated conductor pair 33e includes a first insulated conductor 35e and a second insulated conductor 37e. The exterior surface 35e' and 37e' of the first and second insulated conductors 35e and 37e are formed entirely by first and second insulating materials 41 and 45, respectively. As with the insulated conductor pair 33d, at least one of the exterior surfaces 35e' or 37e' of the first or second insulated conductors 35e or 37e is preferably provided with identifying markings such as a narrow stripe or repeating band 69. The band 69 is preferably of the same color as the insulating material of the insulated conductor that does not have the narrow stripe or repeating band printed thereon. Further, the band 69 is preferably printed in ink. The web or attachment point 63 is preferably formed by one or both of the first and second insulating materials 41, 45.

The insulated conductor pairs 33d and 33e shown in FIGS. 6 and 7, respectively, are all shown as having no portions of the exterior surfaces of their respective first and second insulated conductors formed by second or first insulating material, respectively. It is understood that, if desired, as with the insulated conductor pairs 33a, 33b, and 33c, a portion of the exterior surfaces of one or both of the insulated conductors of the insulated conductor pairs 33d and 33e may be formed by insulating material of the other insulated conductor. Like the insulated conductor pairs 33a, 33b, and 33c, the insulated conductor pairs 33d and 33e are preferably formed by the flow over method and apparatus described above.

Figure 8:
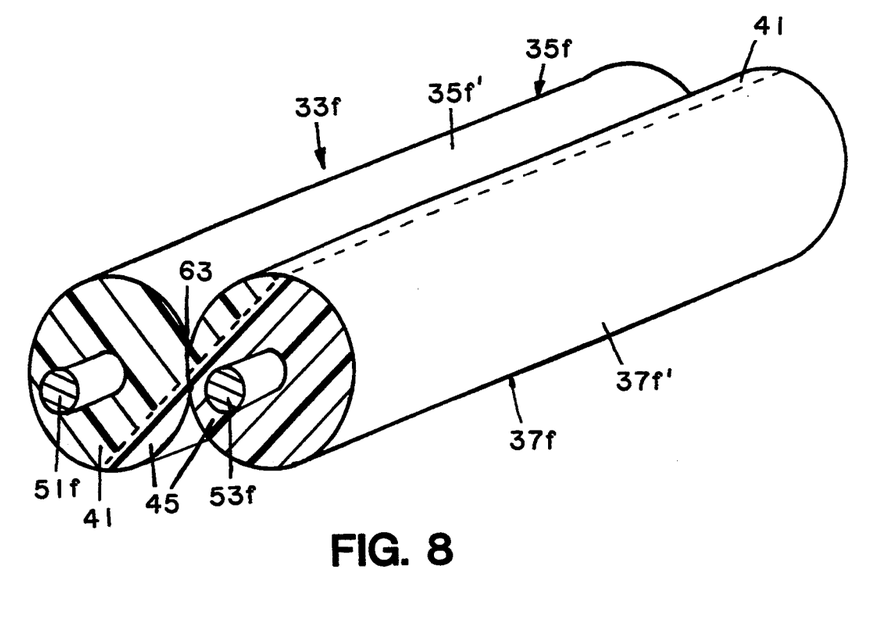
FIG. 8 is a perspective, partially cross-sectional view of a conductor pair according to a sixth embodiment of the present invention.
Figure 9:
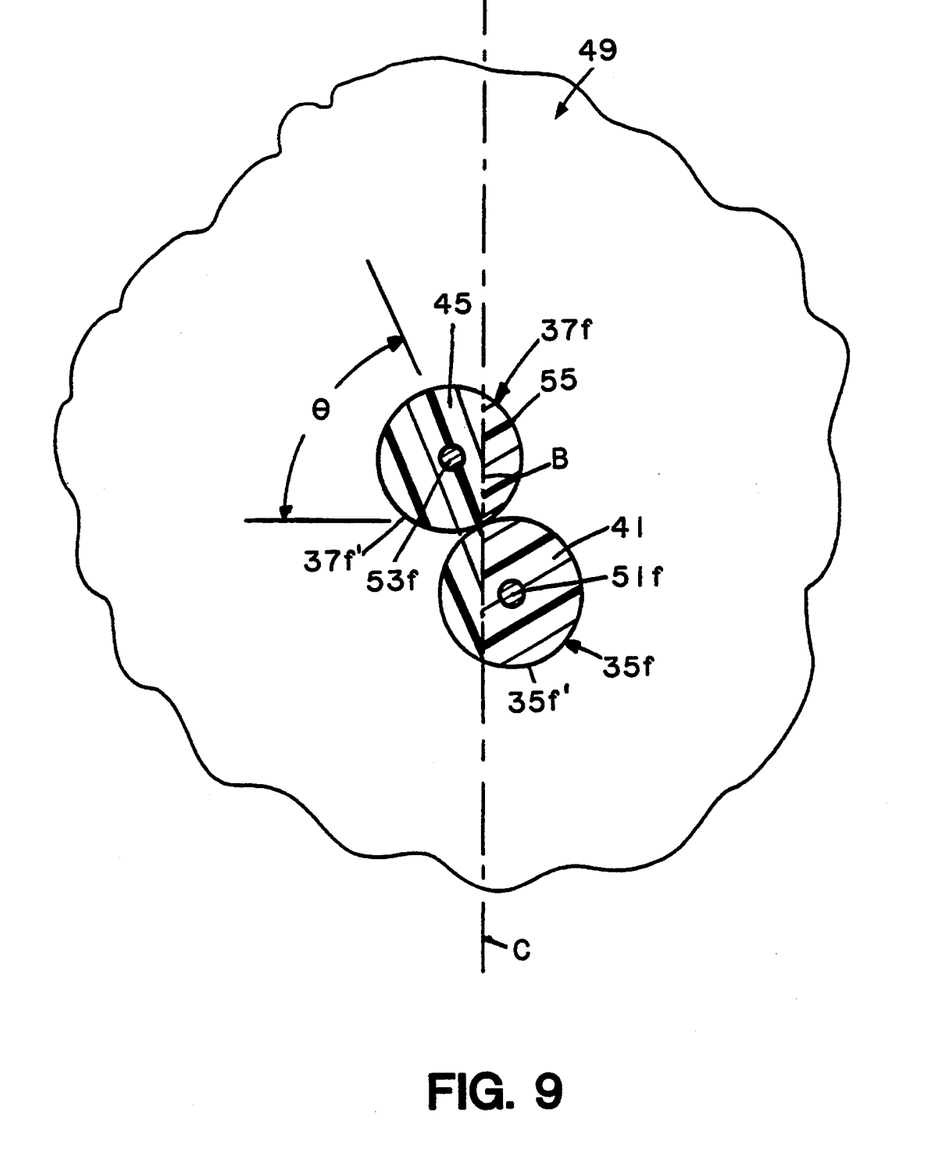
FIG. 9 is a front view of an extruder apparatus arranged for manufacturing the conductor pair shown in FIG. 8.

FIG. 8 shows a sixth embodiment of an insulated conductor pair 33f. In this embodiment, the exterior surface 35f' of the first insulated conductor 35f is primarily formed by first insulating material 41 with a smaller portion of the exterior surface being formed by second insulating material 45. Likewise, the exterior surface 37f' of the second insulated conductor 37f is primarily formed by second insulating material 45 with a smaller portion of the exterior surface being formed by first insulating material 41. Like the insulated conductor pairs 33a–33e, the insulated conductor pair 33f is preferably formed by the flow over method and apparatus 31 described above. Formation of the desired combinations of insulating material 41, 45 on the exterior surfaces 35f' and 37f' of the first and second insulated conductors 35 and 37 is preferably accomplished by rotating the first and second conductors 51f and 53f through a desired angle Θ around a point at the centerline C of the apparatus and the point of contact at the boundary B between the first and second insulating materials as shown in FIG. 9. The opening 55, shown as a figure "8", is also rotated through the desired angle Θ.

While this invention has been illustrated and described in accordance with a preferred embodiment, it is recognized that variations and changes may be made therein without departing from the invention as set forth in the claims.

What is claimed is:

1. An insulated conductor pair comprising:
   a first insulated conductor including a first insulating material over more than half of an exterior surface of the first insulated conductor;
   a second insulated conductor including a second insulating material over more than half of an exterior surface of the second insulated conductor, said second insulating material being different from said first insulating material to distinguish the first and second insulating materials from one another,
   the center-to-center distance between the first and second conductors is maintained within a predetermined range; and
   the first insulated conductor further includes a first conductor and the second insulating material contacts the first conductor.

2. The insulated conductor pair as set forth in claim 1, wherein the first and second insulating materials are different colors.

3. An insulated conductor pair comprising:
   a first insulated conductor including a first insulating material over more than half of an exterior surface of the first insulated conductor;
   a second insulated conductor including a second insulating material over more than half of an exterior surface of the second insulated conductor, said second insulating material being different from said first insulating material to distinguish the first and second insulating materials from one another,
   the center-to-center distance between the first and second conductors is maintained within a predetermined range; and
   the first insulated conductor further includes a first conductor and the second insulating material surrounds the first conductor.

4. The insulated conductor pair as set forth in claim 3, wherein the first and second insulating materials are different colors.

5. An insulated conductor pair comprising:
   a first insulated conductor including a first insulating material over more than half of an exterior surface of the first insulated conductor;
   a second insulated conductor including a second insulating material over more than half of an exterior surface of the second insulated conductor, said second insulating material being different from said first insulating material to distinguish the first and second insulating materials from one another,
   the center-to-center distance between the first and second conductors is maintained within a predetermined range: and
   the first insulating material surrounds the second insulating material surrounding the first conductor.

6. The insulated conductor pair as set forth in claim 5, wherein the first and second insulating materials are different colors.

7. An insulated conductor pair comprising:
   a first insulated conductor including a first conductor and a first insulating material over more than half of an exterior surface of the first insulated conductor, wherein said first insulating material contacts the first conductor;
   a second insulated conductor including a second conductor and a second insulating material over more than half of an exterior surface of the second insulated conductor, wherein said second insulating material contacts the second conductor;
   the second insulating material is different from said first insulating material to distinguish the first and second insulating materials from one another,
   the center-to-center distance between the first and second conductors is maintained within a predetermined range; and
   the first insulating material forms a portion of the exterior surface and extends into an interior portion of the second insulating material of the second insulated conductor.

8. The insulated conductor pair as set forth in claim 7, wherein the first and second insulating materials are different colors.

* * * * *

UNITED STATES PATENT AND TRADEMARK OFFICE
CERTIFICATE OF CORRECTION

PATENT NO. : 5,401,908
DATED : March 28, 1995
INVENTOR(S) : Thomas L. Rodeghero

It is certified that error appears in the above-indentified patent and that said Letters Patent is hereby corrected as shown below:

On the title page: should read item [73] Assignee: Belden Wire & Cable Company, Richmond, Indiana

Signed and Sealed this

Seventeenth Day of October, 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,401,908
DATED : March 28, 1995
INVENTOR(S) : Thomas L. Rodeghero

It is certified that error appears in the above-indentified patent and that said Letters Patent is hereby corrected as shown below:

Column 9, line 1, delete 35f and insert --35f'--

Column 9, line 5, delete 37f and insert --37f'--

Column 9, line 13, delete 35f and insert --35f'--; delete 37f and insert 37f'

Signed and Sealed this

Ninth Day of January, 1996

Attest:

BRUCE LEHMAN

Attesting Officer

Commissioner of Patents and Trademarks